United States Patent [19]

Watanabe

[11] Patent Number: 5,004,194
[45] Date of Patent: Apr. 2, 1991

[54] PIPE/WIRE GRIPPING AND FIXING CLAMP

[75] Inventor: Hideaki Watanabe, Mishima, Japan

[73] Assignee: Usui Kokusai Sangyo Kaisha, Ltd., Japan

[21] Appl. No.: 523,055

[22] Filed: May 11, 1990

[30] Foreign Application Priority Data

May 15, 1989 [JP] Japan .................................. 1-121178

[51] Int. Cl.⁵ ............................................. F16L 3/08
[52] U.S. Cl. ................................. 248/74.5; 174/163 R
[58] Field of Search ....................... 248/74.5, 65, 74.1, 248/74.2, 74.3, 71, 68.1; 285/61, 62; 24/16 PB, 457, 458; 174/163 R, 164, 163 F

[56] References Cited

U.S. PATENT DOCUMENTS

| | | | |
|---|---|---|---|
| 1,164,613 | 12/1915 | Jewell | 248/74.1 X |
| 2,397,279 | 3/1946 | Vesconte | 248/74.3 |
| 2,683,578 | 7/1954 | Rainey | 174/163 R X |
| 3,121,549 | 2/1964 | Loudon | 248/74.3 |
| 3,244,803 | 4/1966 | Becker | 174/154 |
| 4,441,677 | 4/1984 | Byerly | 248/74.3 |
| 4,460,139 | 7/1984 | Bochen | 248/68.1 |
| 4,844,379 | 7/1989 | Umehara | 248/74.3 |
| 4,881,705 | 11/1989 | Kraus | 248/68.1 X |

Primary Examiner—J. Franklin Foss
Attorney, Agent, or Firm—Anthony J. Casella; Gerald E. Hespos

[57] ABSTRACT

A pipe/wire gripping and fixing clamp comprises a gripping wall whose central portion is curved circularly and two attaching walls extending from either end of the gripping wall. The corners of the distal end of one attaching wall are cut off to define oblique edges, whereas the corners of the distal end of the other attaching wall are folded to define triangular hooks. When the one attaching wall is superposed on the other with a member to be secured being seated inside the curved central portion of the gripping wall, the oblique edges are latched by the hooks, whereby the member to be secured is reliably gripped and fixed by the clamp without causing any positional shift between the two attaching walls.

6 Claims, 3 Drawing Sheets

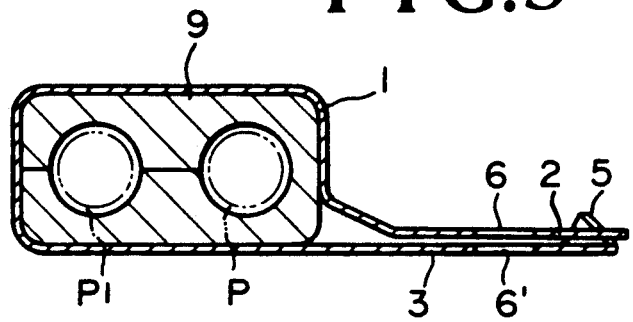
FIG.9
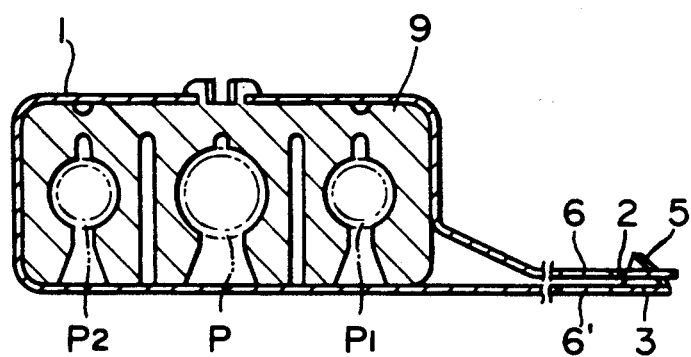
FIG.10
FIG.11
PRIOR ART
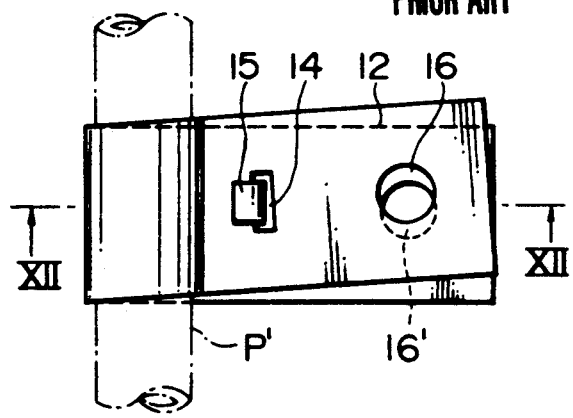
FIG.12
PRIOR ART
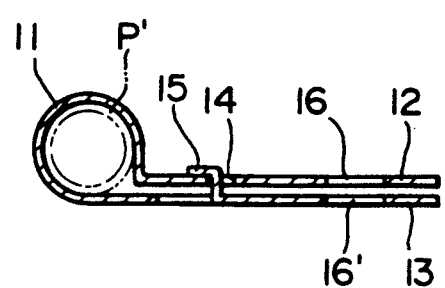

PIPE/WIRE GRIPPING AND FIXING CLAMP

BACKGROUND OF THE INVENTION

1. Field of the Invention:

This invention relates to a clamp which is used in gripping and fixing a small-diameter pipe, not exceeding 20 mm in diameter, (that is used as a path of oil, air, etc. in various machines, devices, and vehicles) as well as a bundle of wires of similar diameter.

2. Description of the Prior Art:

A conventional gripping and fixing clamp for such uses is shown in FIGS. 11 and 12. This clamp comprises a central gripping wall 11 and two attaching walls 12 and 13 contiguous therewith. One attaching wall 12 has an engaging hole 14, and the other 13 has a pawl 15 corresponding to the engaging hole 14. When to grip and fix a member P' to be secured, the pawl 15 is inserted in the engaging hole 14, and then, the distal end of the pawl 15 is bent and caulked. Attaching holes 16 and 16' aligned with each other are used in mounting the member P'.

According to the foregoing prior art, after the pawl 15 is inserted in the engaging hole 14, a caulking jig is required to bend and caulk the distal end of the pawl 15, this making the work troublesome. Further, if the engaging hole 14 is dimensioned with no allowance in view of the size of the pawl 15, a long time is needed to insert the pawl 15 in the engaging hole 14; on the contrary, if it is dimensioned with enough margin, the attaching walls 12 and 13 positionally deviate from each other to cause some lateral shift between the two attaching walls, this making the clamping force of one attaching wall different from that of the other or putting the atching holes 16 and 16' in mis-alignment.

SUMMARY OF THE INVENTION

It is an object of the present invention to provide a pipe/wire gripping and fixing clamp which can grip and fix a member to be secured very readily and quickly in response to a single manual pressing operation, needs no caulking work nor the use of a caulking jig, and causes no unbalance in clamping force and no positional shift between two attaching holes.

To accomplish the foregoing object, the present invention provides a pipe/wire gripping and fixing clamp which comprises a gripping wall having a circularly-curved central portion, and two attaching walls extending from either end of the gripping wall, and is characterized in that each attaching wall has an attaching hole, the corners of the distal end of one attaching wall are cut off to define oblique edges, the corners of the distal end of the other attaching wall are folded to define triangular hooks, and when the one attaching wall is superposed on the other with a member to be secured being seated inside the circularly-curved central portion of the gripping wall, the oblique edges are latched by the hooks, and the attaching holes of the attaching walls are aligned with each other. Preferably, the two attaching walls are bent together at an intermediate position and/or in distal end portions thereof to make the latching of the oblique edges by the hooks reliable.

As will be appreciated, according to the present invention, the oblique edges of the one attaching wall are latched by the triangular hooks of the other in response to a single manual pressing operation and kept in the engaged state by the spring back action of the clamp fabricated by press-working of a band material. Therefore, the member to be secured can be readily and quickly gripped and fixed, and due to the latched state of the oblique edges by the hooks, no unbalance arises in clamping force, and no positional shift occurs between the attaching holes.

BRIEF DESCRIPTION OF THE DRAWINGS

FIGS. 9 and 10 are vertical longitudinal sectional views showing further modified embodiments.

FIG. 11 is a plan view showing a conventional fixing clamp; and

FIG. 12 is a sectional view taken along line XII—XII in FIG. 11.

DETAILED DESCRIPTION OF THE PREFERRED EMBODIMENTS

Figure 1:
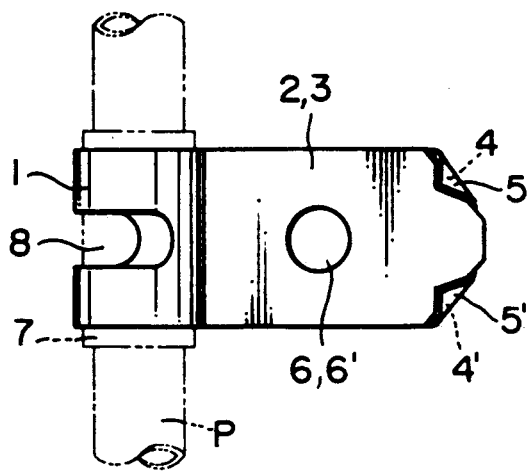
FIG. 1 is a plan view showing a pipe/wire gripping and fixing clamp according to an embodiment of the present invention, by which a member to be secured is secured.
Figure 2:
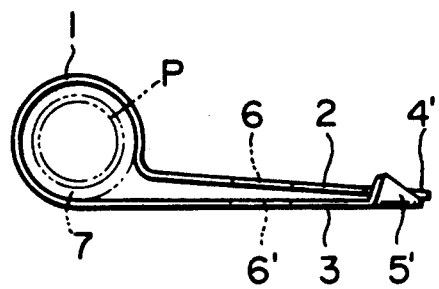
FIG. 2 is a side view corresponding to FIG. 1.
Figure 3:
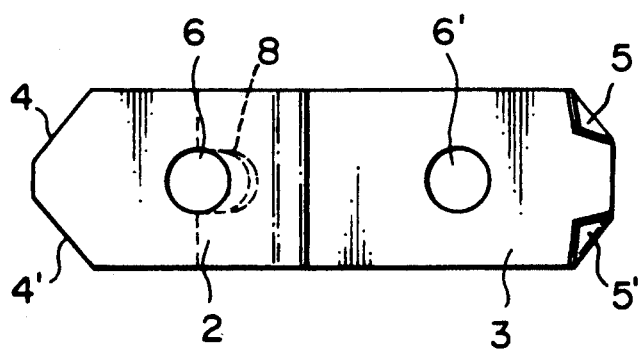
FIG. 3 is a development view of the clamp shown in FIG. 1.
Figure 4:
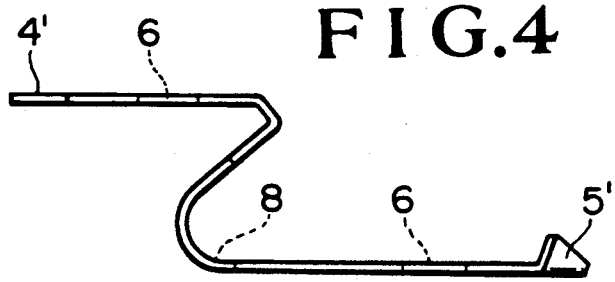
FIG. 4 is a side view corresponding to FIG. 3.

In FIGS. 1 through 6, 1 is a gripping wall forming part of a clamp body, which is made of a metallic band material and whose central portion is curved by press working, this curved central portion being afterward changed in response to a manual pressing operation into a circular shape in cross section, thereby gripping a member P to be secured, such as a pipe or a bundle of wires. 8 is an elongate hole which is formed in the gripping wall as desired to facilitate the curving of the gripping wall. 2 and 3 are attaching walls of a pair which are contiguous with the gripping wall 1 and formed with attaching holes 6 and 6', respectively, that are aligned with each other in response to the manual pressing operation and used in mounting the member P to a machine. The corners of the distal end of one attaching wall 2 are cut off to define oblique edges 4 and 4', and the corners of the distal end of the other attaching wall 3 are folded to define triangular hooks 5 and 5' which extend obliquely inward. When to grip and fix the member P, the member P is seated in the curved central portion of the gripping wall 1 (the illustrated combination additionally includes an elastic bushing 7), the one attaching wall 2 is pressed against the other attaching wall 3 such that the oblique edges 4 and 4' come once to contact with the hooks 5 and 5', and then, the one attaching wall 7 is further pressed such that the member P is brought inside the curved central portion, whereby the oblique edges 4 and 4' are depressed beyond the hooks 5 and 5' and caught thereinside, with the result that the two attaching walls are latched together by the spring back action of the clamp body. In this way, the member P to be secured can be gripped and fixed by a single manual operation. The cooperation of the oblique edges 4 and 4' and the hooks 5 and 5' (symmetric with respect to the center line of the clamp body) causes no positional shift between the attaching walls 2 and 3 or between the attaching holes 6 and 6', whereby the work of bolting the clamp body to a machine can be readily attained afterward.

Figure 5:
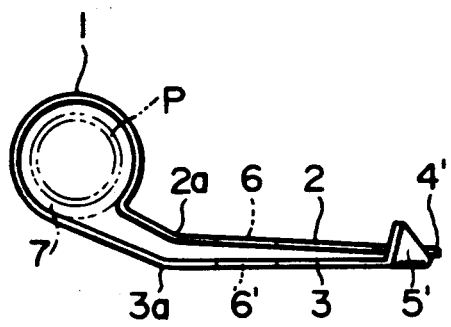
FIGS. 5 and 6 are side views showing other embodiments.
Figure 6:
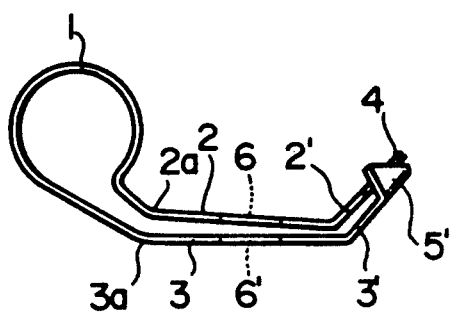

In FIG. 5, the attaching walls 2 and 3 are bent together at an intermediate position to define folded portions 2a and 3a, and in FIG. 6, the attaching walls 2 and 3 are additionally bent in distal end portions 2' and 3' thereof to define additional folded portions, these modifications making the mutual latching of the two attaching walls more smooth and reliable.

The foregoing descriptions are directed to the embodiments to grip and fix a single member P.

Figure 7:
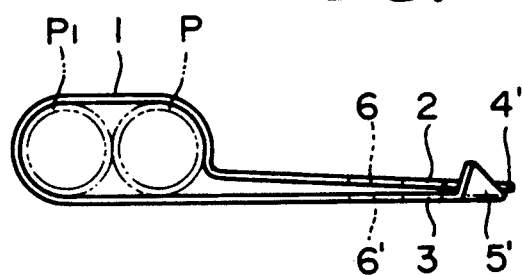
FIGS. 7 and 8 are side views showing still other embodiments.
Figure 8:
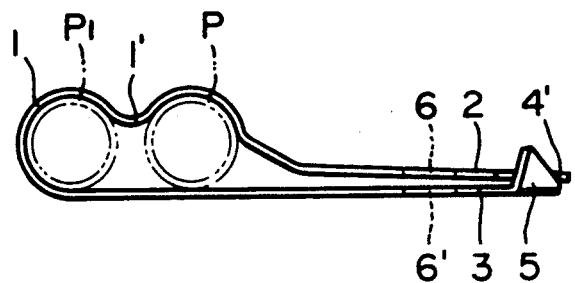

According to the clamp of the present invention a plurality of the members P can be gripped and fixed. That is, as shown in FIG. 7, two members P are laid to be in contact with each other and then gripped and fixed by the clamp or, as shown in FIG. 8, the members P are laid to be distantly spaced from each other and then gripped and fixed. Moreover, a plurality of the members P, P$_1$ —having the same diameter as each other, as shown in FIG. 9, or the members having a different diameter from each other, as shown in FIG. 10, are fixedly held by a thermal insulator block 9 which is, in turn, gripped and fixed by he gripping wall 1 of the clamp.

As described above, in the pipe/wire gripping and fixing clamp according to the present invention, the attaching walls 2 and 3 are latched together by engaging the oblique edges 4 and 4' with the triangular hooks 5 and 5'. Therefore, the member to be secured can be readily and quickly gripped and fixed in response to a single manual pressing operation, a caulking work and a caulking jig are not required, no positional shift arises between the two attaching walls or between the two attaching holes, and the member to be secured can be readily mounted to a machine immediately after it is clamped by the clamp. Further, the clamp of the present invention is simple in structure and can be readily fabricated by press-working of a band material.

What is claimed is:

1. A pipe/wire gripping and fixing clamp comprising an elongated unitary metallic band, having opposed first and second ends and being formed to define a curved gripping wall intermediate the ends, a first attaching wall extending from the gripping wall to the first end of the metallic band, the first attaching wall being cut at the first end to define oblique edges, a second attaching wall extending from the gripping wall to the second end of the metallic band, the second attaching wall defining corners at the second end, said corners being folded toward the first attaching wall to define triangular hooks for latching the oblique edges of the first attaching wall, said attaching walls each being provided with attaching apertures disposed to be in register when the oblique edges of the first attaching wall are latched by the triangular hooks of second attaching wall, whereby a member to be fixed may be gripped in the engaging wall by engaging the oblique edges with the triangular hooks and pressing the attaching walls toward one another into superposed alignment.

2. A pipe/wire gripping and fixing clamp according to claim 1 wherein the metallic band includes a pair of longitudinally extending side edges, the oblique edges at the first end of the metallic band angularly intersecting the respective side edges of the band.

3. A pipe/wire gripping and fixing clamp according to claim 1, wherein the two attaching walls are bent together at an intermediate position to make the latching of the oblique edges by the hooks reliable.

4. A pipe/wire gripping and fixing clamp according to claim 3, wherein the two attaching walls are further bent in distal end portions thereof to make the latching of the oblique edges by the hooks more reliable.

5. A pipe/wire gripping and fixing clamp according to claim 1, wherein an elastic bushing is interposed between the gripping wall and the member to be secured.

6. A pipe/wire gripping and fixing claim according to claim 1, wherein the gripping wall has a hole being long in the lengthwise direction thereof.

* * * * *